United States Patent
Yoon et al.

(10) Patent No.: US 12,079,565 B2
(45) Date of Patent: Sep. 3, 2024

(54) ELECTRONIC DEVICE FOR GENERATING SUMMARY INFORMATION OF CONVERSATION TEXT AND OPERATING METHOD THEREOF

(71) Applicant: Samsung Electronics Co., Ltd., Suwon-si (KR)

(72) Inventors: Sanghyuk Yoon, Suwon-si (KR); Heejun Song, Suwon-si (KR); Jeongho Mok, Suwon-si (KR); Jaemin Song, Suwon-si (KR); Heejae Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 395 days.

(21) Appl. No.: 17/441,766

(22) PCT Filed: Aug. 10, 2021

(86) PCT No.: PCT/KR2021/010575
§ 371 (c)(1),
(2) Date: Sep. 22, 2021

(87) PCT Pub. No.: WO2022/039433
PCT Pub. Date: Feb. 24, 2022

(65) Prior Publication Data
US 2022/0309231 A1    Sep. 29, 2022

(30) Foreign Application Priority Data
Aug. 20, 2020 (KR) .................. 10-2020-0104808

(51) Int. Cl.
*G10L 15/22* (2006.01)
*G06F 40/166* (2020.01)
(Continued)

(52) U.S. Cl.
CPC ............ *G06F 40/166* (2020.01); *G06F 40/20* (2020.01); *G06F 40/35* (2020.01)

(58) Field of Classification Search
None
See application file for complete search history.

(56) References Cited

U.S. PATENT DOCUMENTS 9,116,984 B2 *  8/2015  Caldwell .............. G06F 16/345
9,576,276 B2    2/2017  Stern et al.
(Continued)

FOREIGN PATENT DOCUMENTS

CN      108052686      5/2018
JP      2016-161967    9/2016
(Continued)

OTHER PUBLICATIONS

International Search Report and Written Opinion dated Nov. 10, 2021 in corresponding International Application No. PCT/KR2021/010575.

*Primary Examiner* — Seong-Ah A Shin
(74) *Attorney, Agent, or Firm* — Nixon & Vanderhye, P.C.

(57) ABSTRACT

A method, performed by an electronic device, of generating summary information of a conversation text, includes: obtaining at least one first summary text extracted from at least one conversation text of a previous conversation; extracting at least one second summary text from a conversation text of a current conversation; identifying, from among the at least one first summary text, a summary text having a same type as a type of the at least one second summary text; adjusting a score indicating an accuracy of the identified summary text; selecting, from among the at least one first summary text and the at least one second summary text, a summary text corresponding to each of at
(Continued)

least one specified type based on a score of each summary text; and generating the summary information based on the selected summary text.

9 Claims, 6 Drawing Sheets

(51) Int. Cl.
  *G06F 40/20* (2020.01)
  *G06F 40/35* (2020.01)

(56) References Cited

U.S. PATENT DOCUMENTS

| | | | | |
|---|---|---|---|---|
| 10,388,272 | B1 * | 8/2019 | Thomson | G10L 15/22 |
| 10,594,757 | B1 * | 3/2020 | Shevchenko | G06F 17/18 |
| 11,341,331 | B2 * | 5/2022 | Liao | G06N 20/00 |
| 2013/0006973 | A1 | 1/2013 | Caldwell et al. | |
| 2019/0182382 | A1 * | 6/2019 | Mazza | H04M 3/527 |
| 2021/0182342 | A1 * | 6/2021 | Yamada | G06F 16/904 |
| 2021/0209121 | A1 * | 7/2021 | Liu | G10L 15/22 |
| 2021/0374338 | A1 * | 12/2021 | Shrivastava | G06F 40/30 |
| 2022/0189468 | A1 * | 6/2022 | Hirao | G10L 15/193 |

FOREIGN PATENT DOCUMENTS

| | | |
|---|---|---|
| JP | 2019-121139 | 7/2019 |
| JP | 2020-016949 | 1/2020 |
| KR | 10-1508260 | 3/2015 |
| KR | 10-2016-0101302 | 8/2016 |
| KR | 10-2019-0117840 | 10/2019 |
| KR | 10-2020-0021162 | 2/2020 |
| WO | 2020/036190 | 2/2020 |

* cited by examiner

ELECTRONIC DEVICE FOR GENERATING SUMMARY INFORMATION OF CONVERSATION TEXT AND OPERATING METHOD THEREOF

CROSS-REFERENCE TO RELATED APPLICATIONS

This application is a national stage of International Application No. PCT/KR2021/010575 designating the United States, filed on Aug. 10, 2021, in the Korean Intellectual Property Receiving Office and claiming priority to Korean Patent Application No. 10-2020-0104808, filed Aug. 20, 2020, in the Korean Intellectual Property Office, the disclosures of which are incorporated by reference herein in their entireties.

BACKGROUND

Field

The disclosure relates to an electronic device for generating summary information of a conversation text and an operating method thereof.

Description of Related Art

Customer consultation may be performed in various ways. For example, customer consultation may be performed not only by telephone, but also by chatting. Chat consultation can be performed in real time by exchanging text messages between a customer and a customer service agent, and has an advantage in that the agent can consult with a large number of customers at the same time.

However, when a single customer service agent chats with a large number of customers at the same time, it is difficult for the agent to clearly remember the contents of the consultation with the customer and it may be difficult to proceed with the consultation smoothly. Therefore, there is a need for a method of summarizing the content of a chat consultation in real time and providing it to the agent so that the agent can easily and quickly grasp the content of the consultation.

SUMMARY

Embodiments of the disclosure provide an electronic device for generating summary information of a conversation text and an operating method of the electronic device.

Embodiments of the disclosure provide a non-transitory computer-readable recording medium having recorded thereon a program for executing the above method. The technical problem to be solved is not limited to the technical problems as described above, and other technical problems may exist.

According to an example embodiment of the disclosure, a method, performed by an electronic device, of generating summary information of a conversation text, includes: obtaining at least one first summary text extracted from at least one conversation text of a previous conversation; extracting at least one second summary text from a conversation text of a current conversation; identifying, from among the at least one first summary text, a summary text having a same type as a type of the at least one second summary text; adjusting a score indicating an accuracy of the identified summary text; selecting, from among the at least one first summary text and the at least one second summary text, a summary text corresponding to each of at least one preset type based on a score of each summary text; and generating the summary information based on the selected summary text.

According to an example embodiment of the disclosure, an electronic device for generating summary information with respect to a conversation text, includes: a memory storing at least one first summary text extracted from at least one conversation text of a previous conversation; at least one processor configured to: extract at least one second summary text from a conversation text of a current conversation; identify, from among the at least one first summary text, a summary text having a same type as a type of the at least one second summary text; adjust a score indicating an accuracy of the identified summary text; select, from among the at least one first summary text and the at least one second summary text, a summary text corresponding to each of at least one preset type based on a score of each summary text; and generate the summary text based on the selected summary text; and an output module comprising output circuitry configured to output the summary information.

According to an example embodiment of the disclosure, a non-transitory computer-readable recording medium having stored therein a program for executing the above method is included.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Throughout the disclosure, the expression "at least one of a, b or c" indicates only a, only b, only c, both a and b, both a and c, both b and c, all of a, b, and c, or variations thereof.

Hereinafter, the disclosure will be described in greater detail with reference to the accompanying drawings, in which various example embodiments of the disclosure are illustrated and described. This disclosure may, however, be embodied in many different forms and should not be construed as being limited to an embodiments set forth herein. Elements not related to description may be omitted in the drawings for clear description of the disclosure, and like reference numerals in the drawings denote like elements throughout the disclosure.

In the description of an embodiments, it will also be understood that when an element is referred to as being "connected to" another element, it can be directly connected to the other element, or it can be electrically connected to the other element and intervening elements may be present. When a part may "include" a certain element, unless specified otherwise, it may not be construed to exclude another element but may be construed to further include other elements.

Functions related to artificial intelligence according to the disclosure may be implemented through a processor and a memory. The processor may be include one or more processors. In this case, one or more processors may include, for example, and without limitation, a general-purpose processor such as a central processing unit (CPU), a dedicated processor, an application processor (AP), a digital signal processor (DSP), a graphics-only processor such as a graphics processing unit (GPU), a vision processing unit (VPU), an artificial intelligence-only processor such as a neural processing unit (NPU), or the like. One or more processors process input data according to a predefined operation rule or an artificial intelligence model stored in the memory. When one or more processors are dedicated artificial intelligence processors, the dedicated artificial intelligence processor may be designed with a hardware structure specialized for processing a specific artificial intelligence model.

The predefined operation rule or the artificial intelligence model may be created through training. When the predefined operation rule or the artificial intelligence model is created through training, a basic artificial intelligence model may be trained using a plurality of training data based on a learning algorithm, so that the predefined operation rule or the artificial intelligence model set to perform a desired characteristic (or purpose) is created. Such training may be performed in a device itself on which the artificial intelligence according to the disclosure is performed, or may be performed through a separate server and/or system. Examples of the learning algorithm include, for example, supervised learning, unsupervised learning, semi-supervised learning, reinforcement learning, or the like, but are not limited to the above-described examples.

The artificial intelligence model may include a plurality of neural network layers. Each of the plurality of neural network layers may have a plurality of weight values, and performs a neural network operation through a calculation between an operation result of a previous layer and the plurality of weights. The plurality of weights of the plurality of neural network layers may be optimized based on a learning result of an artificial intelligence model. For example, a plurality of weights may be updated to reduce or minimize a loss value or a cost value obtained from the artificial intelligence model during the training process. The artificial neural network may include a deep neural network (DNN), including, for example, and without limitation, Convolutional Neural Network (CNN), Deep Neural Network (DNN), Recurrent Neural Network (RNN), Restricted Boltzmann Machine (RBM), Deep Belief Network, Bidirectional Recurrent Deep Neural Network (BRDNN), Deep Q-Networks, and the like, but is not limited to the above-described examples.

Hereinafter, the disclosure will be described in greater detail with reference to the accompanying drawings.

Figure 1:
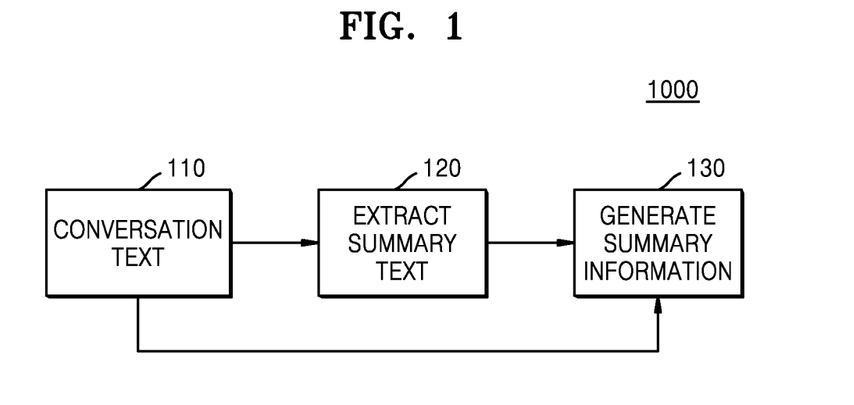
FIG. 1 is a block diagram illustrating an example of generating summary information of a conversation text, according to various embodiments.

FIG. 1 is a block diagram illustrating an example of generating summary information of a conversation text according to various embodiments.

Referring to FIG. 1, an electronic device 1000 according to an embodiment of the disclosure may extract 120 a summary text from a conversation text 110, and generate 130 summary information based on the extracted summary text 120 and the conversation text 110. As the summary information according to an embodiment of the disclosure is provided to a user of the electronic device 1000, for example, a customer service agent conducting chatting consultation, the customer service agent may easily grasp the content of the chatting consultation conducted with a customer, from the summary information.

The electronic device 1000 according to an embodiment of the disclosure may be implemented in various forms. Examples of the electronic device 1000 described in the present specification may include, for example, a digital camera, a smart phone, a laptop computer, a tablet PC, an electronic book terminal, a digital broadcasting terminal, and personal digital assistants (PDAs), a portable multimedia player (PMP), a navigation device, an MP3 player, a vehicle, and the like, but are not limited thereto. The electronic device 1000 described herein may include a wearable device that can be worn by a user. Wearable devices may include, for example, at least one of accessory-type devices (e.g. watches, rings, wristbands, ankle bands, necklaces, glasses, contact lenses), head-mounted-devices (HMD), fabric or clothing-integrated devices (e.g., electronic clothing), a body-attached device (e.g., a skin pad), or a bio-implantable device (e.g., an implantable circuit), but are not limited thereto.

The conversation text 110 according to an embodiment of the disclosure may include content of a message conversation with a plurality of users. The conversation text 110 according to an embodiment of the disclosure is not limited to a message conversation, and may include conversation content that is obtained through voice recognition of a voice conversation and converting the voice conversation into a text.

The conversation text 110 according to an embodiment of the disclosure may be generated for each chat window generated for each chat partner when there are a plurality of chat partners for a user of the electronic device 1000. Accordingly, the summary information 130 according to an embodiment of the disclosure may be generated for each chat window. For example, when a customer service agent is conducting chat consultation with multiple customers at the same time, content of a message conversation conducted with respect to each customer may be generated as the conversation text 110, respectively. In addition, the summary information 130 of each conversation text 110 may be generated and provided to the user.

The conversation text 110 according to an embodiment of the disclosure is not limited to chatting consultation by a customer service agent but may also include conversation messages of chatting consultation via a chatbot. For example, before chat consultation by a customer service agent is performed, chat consultation may be first automatically performed by a chatbot, and then the chat consultation may be performed by the customer service agent according to a customer request. Accordingly, the conversation text 110 according to an embodiment of the disclosure is not limited to content of a message conversation held with a plurality of users, but may also include content of a message conversation generated by a chatbot system that automatically generates conversation messages.

In addition, a customer service agent performing a chat consultation according to an embodiment of the disclosure is provided with the summary information 130 generated with respect to chat consultation by a chatbot and may thus quickly and easily grasp the content related to the chat consultation performed earlier.

The summary text 120 according to an embodiment of the disclosure may be obtained by extracting an entity or topic of a preset type from the conversation text 110. The summary text 120 according to an embodiment of the disclosure may include an entity or topic extracted from the conversation text 110 for each of at least one preset type.

A type according to an embodiment of the disclosure may be set to a type from which an entity or topic of high importance among the conversation text 110 may be extracted. For example, when a chat consultation includes a content of inquiring about a service regarding a product, a product name and a purchase date among the conversation content may be extracted as important information. Accordingly, the product name and the purchase date may be preset as a type with respect to the summary text 120 so that the product name and the purchase date which are of high importance may be extracted from the conversation text 110. In addition, the disclosure is not limited to the above example, and various types, such as a product name, a purchase date, a serial number, a conversation topic, a type of inquiry, whether a problem is solved, and a satisfaction level of consultation, may be preset to extract the summary text 120.

According to an embodiment of the disclosure, the summary text 120 may be extracted from the conversation text 110 using a pre-trained artificial intelligence model, for example, a natural language understanding model (NLU). According to an embodiment of the disclosure, a feature of each text included in the conversation text 110 may be extracted, and a text corresponding to a preset type among texts of the conversation text 110 may be identified based on the extracted feature. According to an embodiment of the disclosure, the identified text may be obtained as an entity or topic corresponding to each type.

The summary information 130 according to an embodiment of the disclosure may be generated based on the conversation text 110 and the summary text 120. The summary information 130 according to an embodiment of the disclosure may include at least one of a summary form or a summary sentence. The summary form according to an embodiment of the disclosure may include information on the summary text 120 corresponding to each preset type. In addition, the summary sentence according to an embodiment of the disclosure may include at least one sentence generated by summarizing the conversation text 110. In this case, the summary sentence may be generated to include the summary text 120. As the summary text 120 according to an embodiment of the disclosure may include an entity or topic which are of high importance, the summary sentence may be generated to include the summary text 120. The summary information 130 is not limited to the above example, and may include various types of information in which the conversation text 110 is summarized.

At least one of extraction of the summary text 120 or generation of the summary information 130 according to an embodiment of the disclosure may be performed in real time each time the conversation text 110 is obtained. According to an embodiment of the disclosure, as a conversation progresses, a new conversation text 110 may be continuously obtained, and each time a new conversation text 110 is obtained, at least one of extraction of the summary text 120 or generation of the summary information 130 may be repeatedly performed.

The electronic device 1000 according to an embodiment of the disclosure may further use a server (not shown) in generating summary information based on a conversation text.

The server (not shown) may be implemented using at least one computer device. The server (not shown) may be distributed in a cloud form, and may provide commands, codes, files, contents, and the like.

The server (not shown) may perform operations that the electronic device 1000 may execute. For example, the server (not shown) may obtain the conversation text 110 based on information related to a conversation received from the electronic device 1000, generate summary information about the conversation text 110, and transmit the summary information to the electronic device 1000. However, the disclosure is not limited to the above example, and the server (not shown) may perform various operations for the electronic device 1000 to generate summary information according to an embodiment of the disclosure, and may transmit results of the operations to the electronic device 1000.

Figure 2:
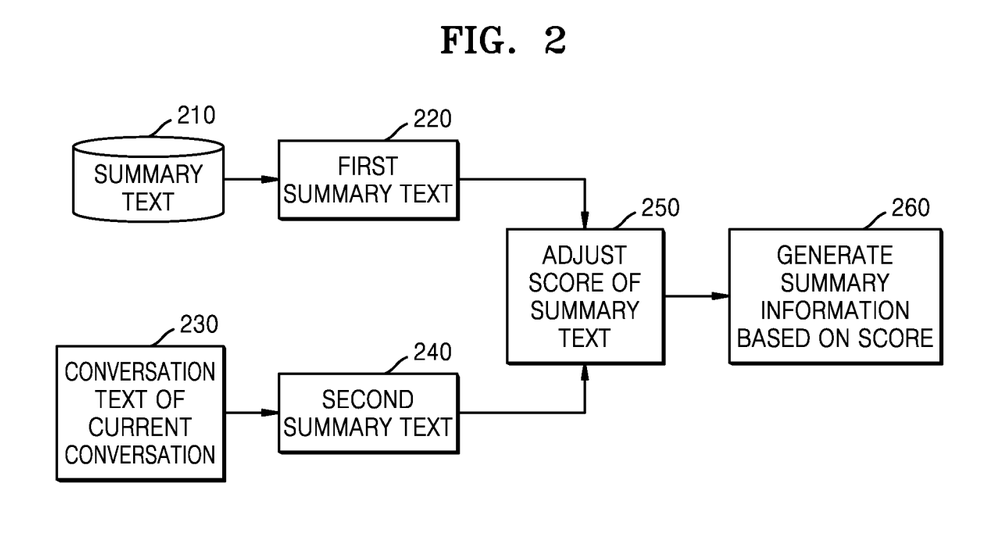
FIG. 2 is a block diagram illustrating an example of generating summary information, according to various embodiments.

FIG. 2 is a block diagram illustrating an example of generating summary information, according to various embodiments.

Referring to FIG. 2, the electronic device 1000 according to an embodiment of the disclosure may generate summary information based on a summary text obtained with respect to a previous conversation and a summary text obtained with respect to a current conversation.

According to an embodiment of the disclosure, among summary texts obtained with respect to a previous conversation, there may be a summary text having a same type as that of a summary text obtained with respect to a current conversation. For example, when the content mentioned in the previous conversation is reversed in the current conversation, the same type of summary text as that of the previously extracted summary text may be obtained. For example, a customer may reverse a model name mentioned in the previous conversation in the current conversation and refer to another model name. In this case, the summary information 130 generated based on the content of the previous conversation may be modified to reflect the content of the current conversation. For example, by reflecting the contents of the current conversation, the summary information 130 including information related to the model name mentioned in the previous conversation may be modified to include the model name mentioned in the current conversation.

The summary information 130 according to an embodiment of the disclosure may include one summary text for each type. Thus, when each summary text is obtained, a score indicating an accuracy of each summary text may also be determined, and a summary text to be used to generate the summary information 130 may be selected for each type based on the score.

The score according to an embodiment of the disclosure may be determined based on probability information of an extracted summary text based on features of a conversation text. For example, when a conversation text, from which a summary text is extracted, has more features corresponding to the summary text, the conversation text has a higher probability value, and a large value may be determined as a score of the summary text. On the other hand, when a conversation text, from which a summary text is extracted, has fewer features corresponding to the summary text, the conversation text has a lower probability value, and a small value may be determined as a score of the summary text.

A score according to an embodiment of the disclosure may be obtained based on features of a conversation text that is in units of sentences and includes a summary text. The score is not limited to the above example and may be obtained based on a wide range of conversation texts used to extract a summary text.

In addition, the score according to an embodiment of the disclosure is not limited to a conversation text used to extract a summary text, but may be modified based further on at least one other conversation text adjacent to the conversation text. For example, when a current summary text is extracted from a conversation text that is in units of sentences and corresponds to a current conversation, a score of the current summary text may be modified based on at least one conversation text corresponding to a previous conversation and at least one conversation text corresponding to a conversation held after the above at least one conversation text. Accordingly, after the latter conversation is ended, for example, after all conversations are ended, the score may be additionally modified based on the latter conversation and previous conversations.

In addition, as the score according to an embodiment of the disclosure is modified not only based on a conversation text of the current conversation but also based on conversation texts with respect to previous and subsequent conversations, a score value in which a contextual flow based on the previous and subsequent conversations is reflected may be obtained. For example, when a summary text includes content that does not fit a contextual flow, a lower score value may be determined with respect to the summary text.

According to an embodiment of the disclosure, a final score of each summary text may be finally determined based on a first score and a second score obtained with respect to each summary text. The first score according to an embodiment of the disclosure may include a score adjusted as a summary text having a same type is newly extracted. In addition, the second score may include a score obtained by further reflecting a contextual flow based on a previous conversation and a subsequent conversation.

According to an embodiment of the disclosure, a final score value of each summary text may be determined based on a value obtained by multiplying the first score by the second score. A final score value of a summary text is not limited to the above-described example, and may be obtained using various methods, based on the first score and the second score.

In addition, according to an embodiment of the disclosure, a summary text corresponding to each preset type may be selected according to a final score value, and summary information may be generated based on the selected summary text.

A first summary text 220 according to an embodiment of the disclosure may include a summary text 210 extracted from at least one conversation text of a previously held conversation. Among the first summary text 220 according to an embodiment of the disclosure, a summary text having a same type as a type of a second summary text 240 extracted from a conversation text 230 of a current conversation may be identified.

According to an embodiment of the disclosure, a score of a summary text identified among the first summary text 220 may be adjusted using the second summary text 240 at 250. For example, as a summary text having a same type as that of the first summary text 220 is extracted from the conversation text 230 of the current conversation, a score of the first summary text 220 may be adjusted to a lower value, for example, a value less than a current value by a preset (e.g., specified) constant value. The score of the first summary text 220 extracted from the previous conversation is lowered by considering that the recently mentioned conversation content is to be more accurate than the previous conversation content.

However, the disclosure is not limited to the above-described example, and even when the score of the first summary text 220 is lowered, when the score of the second summary text 240 is relatively lower than the score of the first summary text 220, the score of the first summary text 220 may be higher than the score of the second summary text 240.

According to an embodiment of the disclosure, at 260, the summary information 130 may be generated based on a score of each summary text. According to an embodiment of the disclosure, for each type of conversation text 110 generated in real time, at least one summary text selected based on a score may exist with respect to each type. The summary information 130 according to an embodiment of the disclosure may be generated based on a score, based on a summary text selected with respect to each type. For example, a summary text having a highest score may be selected with respect to each type, and the summary information 130 may be generated based on the selected summary text.

According to an embodiment of the disclosure, each time the conversation text 230 with respect to the current conversation is obtained, adjustment of a score of the summary text 250 may be performed. Accordingly, according to an embodiment of the disclosure, each time the adjustment of the score 250 is performed, a summary text may be selected again for each type, and the summary information 130 may be generated according to the reselected summary text. For example, in the current conversation, as the model name is reversed, a summary text selected with respect to a type of the model name may be modified, and the summary information 130 may be generated according to the differently selected summary text.

Figure 3:
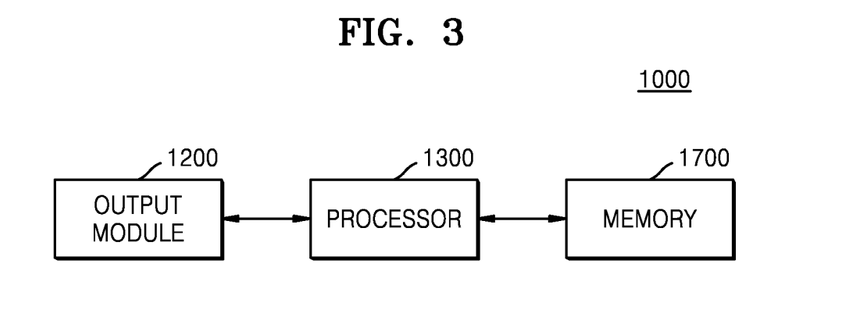
FIG. 3 is a block diagram illustrating an example configuration of an electronic device according to various embodiments.

FIG. 3 is a block diagram for describing an example configuration of the electronic device 1000 according to various embodiments.

Figure 4:
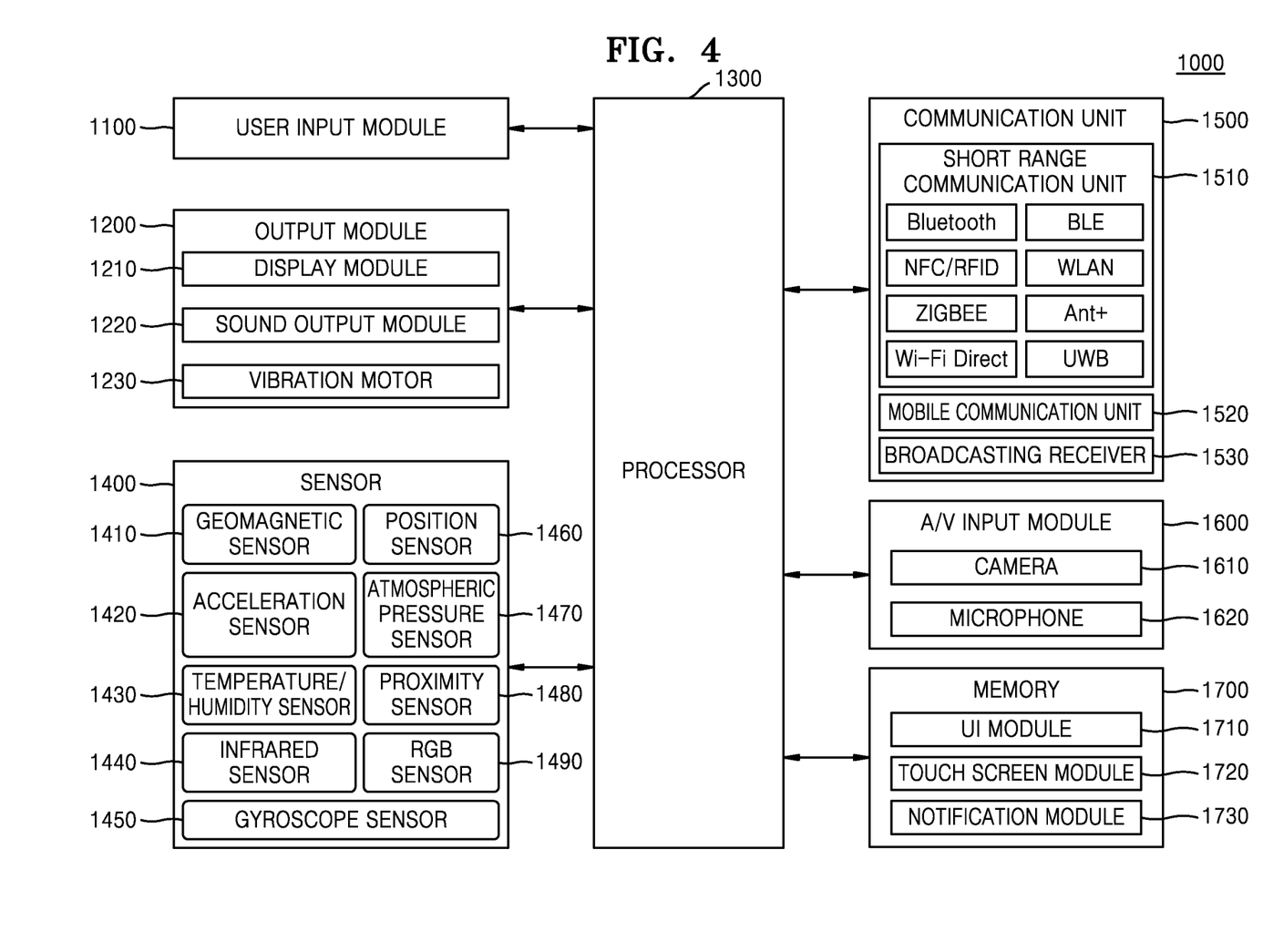
FIG. 4 is a block diagram illustrating an example configuration of an electronic device according to various embodiments.

FIG. 4 is a block diagram illustrating an example configuration of the electronic device 1000 according to various embodiments.

Referring to FIG. 3, the electronic device 1000 may include a processor (e.g., including processing circuitry) 1300, and an output module (e.g., including output circuitry) 1200, and a memory 1700. However, not all components illustrated in FIG. 3 are essential components of the electronic device 1000. The electronic device 1000 may be implemented using more components than those illustrated in FIG. 3 or fewer components than those illustrated in FIG. 3.

For example, as illustrated in FIG. 4, the electronic device 1000 may further include, in addition to the processor 1300, and the output module 1200, and the memory 1700, a user input module (e.g., including input circuitry) 1100, a sensor 1400, a communication unit (e.g., including communication circuitry) 1500 and an audio/video (A/V) input module (e.g., including A/V input circuitry) 1600.

The user input module 1100 may include various input circuitry included, for example, in a module used by a user to input data for controlling the electronic device 1000. For example, the user input module 1100 may include a key pad, a dome switch, a touch pad (a contact-type capacitance method, a pressure-type resistive film method, an infrared detection method, a surface ultrasonic conduction method, an integral tension measurement method, a piezo-effect method, etc.), a jog wheel, a jog switch, and the like, but is not limited thereto.

According to an embodiment of the disclosure, the user input module 1100 may receive a user input for generating summary information on a conversation text. For example, the user input module 1100 may receive a user input for inputting a conversation text.

The output module 1200 may include various output circuitry and output an audio signal, a video signal, a vibration signal, etc., and the output module 1200 may include a display module (e.g., including a display) 1210, a sound output module (e.g., including sound output circuitry) 1220, and a vibration motor 1230.

The display module 1210 may include a display that displays and outputs information processed by the electronic device 1000. According to an embodiment of the disclosure, the display module 1210 may output summary information generated with respect to a conversation text.

When the display module 1210 and a touch pad are configured as a touch screen in a layered structure, the display module 1210 may also be used as an input device in addition to as an output device. The display module 1210 may include at least one of a liquid crystal display, a thin-film transistor-liquid crystal display, an organic light-emitting diode, a flexible display, a three-dimensional (3D) display, or an electrophoretic display. In addition, according to an implementation form of the electronic device 1000, the electronic device 1000 may include two or more display modules 1210.

The sound output module 1220 may include various output circuitry and output audio data received from a communication unit 1500 or stored in the memory 1700. The vibration motor 1230 may output a vibration signal. In addition, the vibration motor 1230 may output a vibration signal when a touch is input to the touch screen. According to an embodiment of the disclosure, the sound output module 1220 and the vibration motor 1230 may output information related to summary information generated with respect to a conversation text.

The processor 1300 may include various processing circuitry and typically controls the overall operation of the electronic device 1000. For example, the processor 1300 may execute programs stored in the memory 1700 to thereby control the user input module 1100, the output module 1200, the sensor 1400, the communication unit 1500, the A/V input module 1600, or the like, overall.

The electronic device 1000 may include at least one processor 1300. For example, the electronic device 1000 may include various types of processors such as, for example, and without limitation, a central processing unit (CPU), a dedicated processor, a graphics processing unit (GPU), a neural processing unit (NPU), or the like.

The processor 1300 may be configured to process commands of a computer program by performing basic arithmetic, logic, and input/output operations. A command may be provided to the processor 1300 from the memory 1700 or may be received through the communication unit 1500 and provided to the processor 1300. For example, the processor 1300 may be configured to execute a command according to a program code stored in a recording device such as a memory.

The processor 1300 according to an embodiment of the disclosure may obtain a first summary text extracted from at least one conversation text of a previously held conversation and a second summary text extracted from a conversation text of a current conversation. The processor 1300 may identify a summary text having a same type as a type of the second summary text, from among at least one first summary text.

The processor 1300 according to an embodiment of the disclosure may adjust a score indicating accuracy of the identified summary text among first summary texts. For example, the score may be adjusted to have a value less than a current value by a preset constant value. Accordingly, as the accuracy of the first summary text extracted from the previous conversation is lowered as the second summary text extracted from the current conversation of the same type is extracted, a probability that the first summary text is included in the summary information may decrease.

The processor 1300 according to an embodiment of the disclosure may select each summary text corresponding to at least one preset type, based on a score indicating accuracy of each of the first summary text and the second summary text, and generate summary information based on the selected summary text. For example, a summary text may be selected with respect to each type based on a score, and summary information may be generated based on the selected summary text.

The sensor 1400 may detect a state of the electronic device 1000 or a state around the electronic device 1000 and transmit the sensed information to the processor 1300.

The sensor 1400 may include at least one of a geomagnetic sensor 1410, an acceleration sensor 1420, a temperature/humidity sensor 1430, an infrared sensor 1440, a gyroscope sensor 1450, a position sensor (e.g., GPS) 1460, an atmospheric pressure sensor 1470, a proximity sensor 1480, and/or an RGB sensor (illuminance sensor) 1490, but is not limited thereto.

According to an embodiment of the disclosure, a score value indicating an accuracy of a summary text may be determined based on information detected by the sensor 1400. For example, a score of a summary text may be determined based on features of a conversation text from which the summary text is extracted, but is not limited thereto, and may also be determined based on various information detected using the sensor 1400 in relation to the conversation text. The disclosure is not limited to the above-described example, and a score of a summary text may be determined according to various methods.

The communication unit 1500 may include one or more components that allow the electronic device 1000 to communicate with a server 2000 or an external device (not shown). For example, the communication unit 1500 may include various units or modules, each including various communication circuitry, such as, for example, a short range communication unit 1510, a mobile communication unit 1520, and a broadcast receiver 1530.

The short-range communication unit 1510 may include a Bluetooth communication unit, BLE (Bluetooth Low Energy) communication unit, a Near Field communication unit, a WLAN (Wi-Fi) communication unit, a Zigbee communication unit, an infrared data association (IrDA) communication unit (not shown), a Wi-Fi Direct (WFD) communication unit, an ultra wideband (UWB) communication unit, an Ant+ communication unit, etc., but is not limited thereto.

The mobile communication unit 1520 may transmit and receive a radio signal with at least one of a base station, an external terminal, or a server on a mobile communication network. A radio signal may include a voice call signal, a video call signal, or various types of data according to transmission/reception of text/multimedia messages.

The broadcast receiver 1530 may receive a broadcast signal and/or broadcast-related information from the outside through a broadcast channel. The broadcast channel may include satellite channels and terrestrial channels. According to implementation examples, the electronic device 1000 may not include the broadcast receiver 1530.

The communication unit 1500 according to an embodiment of the disclosure may transmit and receive at least one message to or from an external device. In addition, the communication unit 1500 may transmit and receive voice data for performing a call.

The communication unit 1500 according to an embodiment of the disclosure may transmit or receive information needed to generate summary information of a conversation text. For example, the communication unit 1500 may externally transmit and receive conversation messages corresponding to a conversation text.

The A/V input module 1600 may include various A/V input circuitry for inputting an audio signal or a video signal, and may include, for example, a camera 1610 and a microphone 1620. The camera 1610 may obtain an image frame such as a still image or a video through an image sensor in a video call mode or a photographing mode. The image captured through the image sensor may be processed by the processor 1300 or a separate image processing unit (not shown).

The microphone 1620 receives an external sound signal and processes the same as electrical voice data. For example, the microphone 1620 may receive a voice input of a user having a conversation.

The memory 1700 may store a program for processing and controlling the processor 1300 and may store data input to the electronic device 1000 or output from the electronic device 1000.

The memory 1700 according to an embodiment of the disclosure may store at least one summary text extracted with respect to a previous conversation. The memory 1700 may store summary information generated with respect to a conversation text, according to an embodiment of the disclosure.

The memory 1700 may include at least one type of storage medium from among a flash memory type, a hard disk type, a multimedia card micro type, a card type memory (e.g., SD or XD memory, etc.), random access memory (RAM), static random access memory (SRAM), read-only memory (ROM), electrically erasable programmable read-only memory (EEPROM), programmable read-only memory (PROM), magnetic memory, a magnetic disk, or an optical disk.

Programs stored in the memory 1700 may be classified into a plurality of modules according to their functions, for example, a user interface (UI) module 1710, a touch screen module 1720, a notification module 1730, or the like.

The UI module 1710 may provide a specialized UI, GUI, etc. that are linked with the electronic device 1000 for each application. The touch screen module 1720 may detect a touch gesture by a user on a touch screen and transmit information about the touch gesture to the processor 1300. The touch screen module 1720 according to some embodiments of the disclosure may recognize and analyze a touch code. The touch screen module 1720 may be configured as a separate hardware component including a controller.

Various sensors may be provided inside or near the touch screen to sense a touch on a touch screen or a proximity touch. An example of a sensor for sensing a touch on a touch screen is a tactile sensor. The tactile sensor refers to a sensor that detects a contact of a specific object to the extent that a person feels it or more. The tactile sensor may detect various information such as roughness of a contact surface, hardness of a contact object, and temperature of a contact point.

Examples of a user's touch gesture may include tap, touch & hold, double tap, drag, panning, flick, drag and drop, swipe, and the like.

The notification module 1730 may generate a signal for notifying the occurrence of an event of the electronic device 1000.

Figure 5:
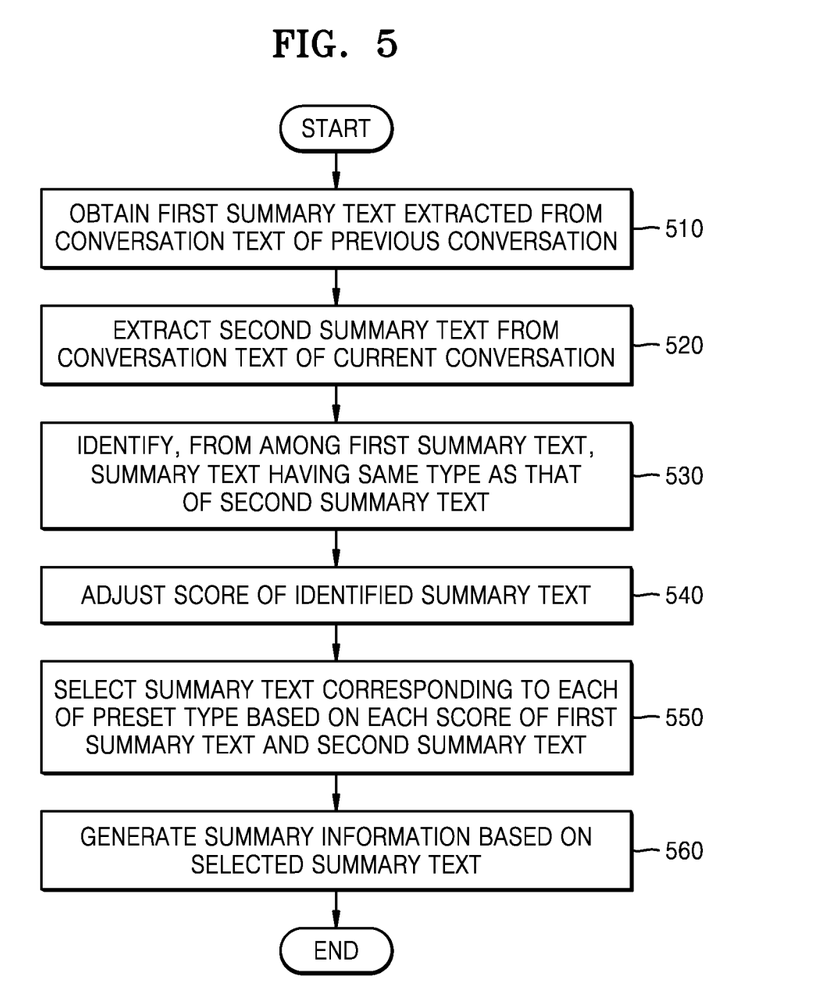
FIG. 5 is a flowchart illustrating an example method of generating summary information of a conversation text, according to various embodiments.

FIG. 5 is a flowchart illustrating an example method of generating summary information of a conversation text according to various embodiments.

Referring to FIG. 5, in operation 510, the electronic device 1000 according to an embodiment of the disclosure may obtain at least one first summary text extracted from at least one conversation text of a previous conversation. Accordingly, the at least one first summary text according to an embodiment of the disclosure may include at least one obtained summary text of previous conversations. A first summary text according to an embodiment of the disclosure may be a summary text stored in the memory 1700 each time a summary text is extracted by the electronic device 1000.

In operation 520, the electronic device 1000 may extract a second summary text from a conversation text of a current conversation. The second summary text according to an embodiment of the disclosure may be obtained by extracting an entity or a topic from the conversation text of the current conversation with respect to each preset type. A type according to an embodiment of the disclosure is a type that is related to a highly important summary text and may be used to generate the summary information 130, for example, various types such as a product name, a customer name, a purchase date, and a topic of consultation or the like may be set in advance.

In operation 530, the electronic device 1000 may identify a summary text having a same type as a type of the second summary text from among the at least one first summary text. According to an embodiment of the disclosure, there is a high possibility that summary texts of the same type include information that is incompatible with each other. Therefore, the summary information 130 may be generated based on a summary text that is determined to have a highest accuracy among summary texts of the same type.

According to an embodiment of the disclosure, when a summary text of a same type as a type of a previously obtained summary text is extracted from a conversation text of a current conversation, a summary text for adjusting a score indicating accuracy of each summary text may be identified.

According to an embodiment of the disclosure, in operation 540, as a score of the identified summary text is lowered, a likelihood that the summary text extracted from the current conversation is used to generate the summary information 130 may be increased. According to an embodiment of the disclosure, as the current conversation includes a content that has been reversed differently from the content of the previous conversation, a summary text of a same type as that of the summary text obtained in the previous conversation may be extracted, and it may be considered that the summary text of the current conversation includes more accurate content than the summary text of the previous conversation, and thus, the score of the identified summary text may be adjusted in operation 540 such that a likelihood that the summary text extracted from the current conversation is used in generating the summary information 130 is increased.

In operation 550, the electronic device 1000 may select each summary text corresponding to a preset (e.g., specified) type based on each score of the at least one first summary text and the at least one second summary text. For example, for each type, a summary text having a highest score value may be selected.

In operation 560, the electronic device 1000 may generate summary information based on the summary text selected in operation 550. According to an embodiment of the disclosure, the summary information may include a summary form in which summary texts are listed according to each type. Also, the summary information may include a summary sentence including at least one sentence generated based on the summary text. The summary information is not limited to the above-described example, and may be generated in various forms based on a summary text.

The summary information generated according to an embodiment of the disclosure may be provided to a user of the electronic device 1000, and the user may easily check the summary information indicating the content of a conversation that has been conducted to present.

Operations 510 through 560 according to an embodiment of the disclosure may be performed each time a second summary text of the current conversation is extracted as the conversation progresses. For example, each time the second summary text of the current conversation is extracted, the score of the identified summary text among the first summary texts may be adjusted, and summary information may be generated based on the newly adjusted score and based on the selected summary text.

Figure 6:
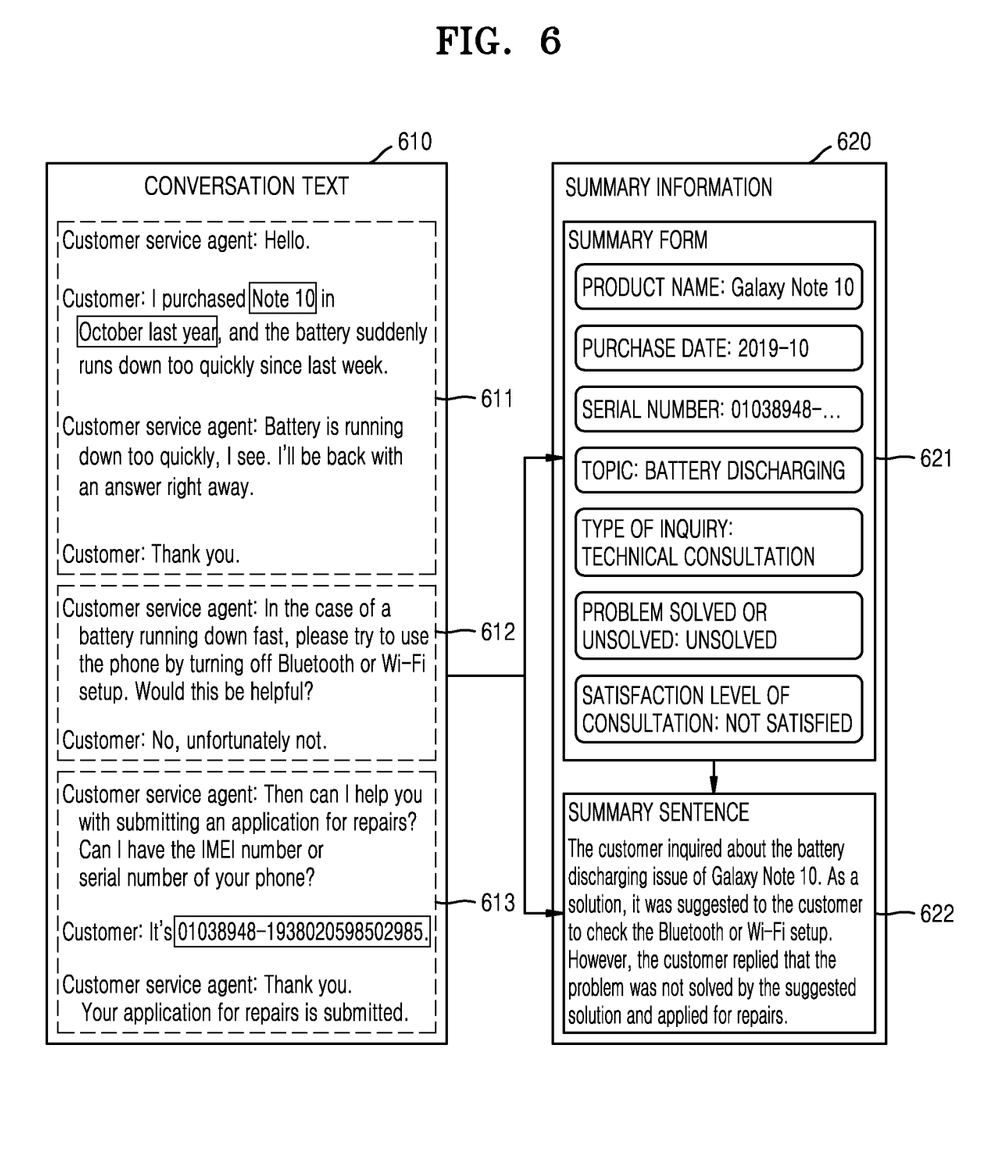
FIG. 6 is a diagram illustrating an example of summary information according to various embodiments.

FIG. 6 is a diagram illustrating an example of summary information according to various embodiments. Referring to FIG. 6, a conversation text 610 of a conversation held between a customer and a customer service agent may be obtained in an order of a first conversation text 611, a second conversation text 612, and a third conversation text 613, which is the order in which parts of the conversation were held.

According to an embodiment of the disclosure, as the conversation proceeds, when the first conversation text 611 is extracted, summary information 620 including at least one of a summary form 621 or a summary sentence 622 may be generated based on the first conversation text 611. For example, from the first conversation text 611, summary texts about a product name, a purchase date, a conversation topic, and an inquiry type from among preset types, "Galaxy Note 10", "2019-10", "battery discharging", and "technical consultation" may be extracted. A summary text according to an embodiment of the disclosure may be obtained as "Note 10" or "October of last year", which is just as the text included in the conversation text 610, but is not limited thereto, and may also be obtained in a form that has the same meaning but is expressed differently: "Galaxy Note 10" and "2019-10". The disclosure is not limited to the above-described example, and variously modified summary texts may be obtained based on the conversation text 610. In addition, a summary sentence 622 may be further generated based on the summary text and the first conversation text 611.

According to an embodiment of the disclosure, after the first conversation text 611, a second conversation text 612 may be additionally obtained. According to an embodiment of the disclosure, the summary information 620 including at least one of the summary form 621 or the summary sentence 622 may be generated based on the newly obtained second conversation text 612. For example, the summary information 620 generated based on the first conversation text 612 may be modified based on the second conversation text 612, to generate the summary information 620 that is based further on the second conversation text 612.

According to an embodiment of the disclosure, from the second conversation text 612, "unsolved" and "unsatisfied", which are summary texts regarding problem solving and the level of satisfaction of consultation, among preset types, may be extracted.

Accordingly, the summary information 620 generated based on the first conversation text 611 may not include information related to a summary text on whether or not the problem is solved and the satisfaction level, but as the second conversation text 612 is obtained, the summary information 620 further including the information related to the summary text on whether or not the problem is solved and the satisfaction level of consultation may be obtained.

According to an embodiment of the disclosure, after the second conversation text 612, a third conversation text 613 may be further obtained. According to an embodiment of the disclosure, the summary information 620 including at least one of the summary form 621 or the summary sentence 622 may be generated based on the newly obtained third conversation text 613. For example, the summary information 620 generated based on the first conversation text 611 and the second conversation text 612 may be modified based on the third conversation text 613 to generate the summary information 620 that is further based on the third conversation text 613.

According to an embodiment of the disclosure, a summary text of a serial number from among preset types, "01038948-1938020598502985", may be extracted from the third conversation text 613.

Accordingly, the summary information 620 generated based on the first conversation text 611 and the second conversation text 612 may not include information related to a summary text of a serial number, but as the third conversation text 613 is obtained, the summary information 620 further including the information related to the serial number may be obtained.

The summary sentence 622 according to an embodiment of the disclosure may be generated based on at least one summary text included in the summary information 620 and the conversation text 610. The summary sentence 622 according to an embodiment of the disclosure may be generated after the conversation is ended, but is not limited thereto, and may also be generated each time a conversation text is generated.

Figure 7:
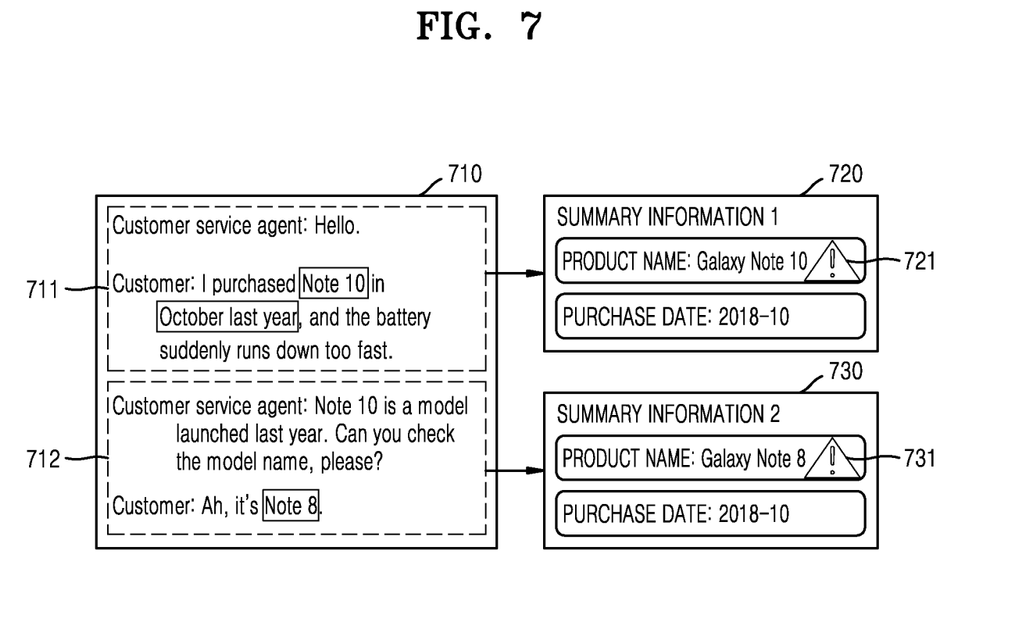
FIG. 7 is a diagram illustrating an example of summary information according to various embodiments.

FIG. 7 is a diagram illustrating an example of summary information according to various embodiments.

Referring to FIG. 7, summary information 1 720 and summary information 2 730 may be obtained based on a conversation text 710.

According to an embodiment of the disclosure, based on a first conversation text 711 obtained earlier from among the conversation text 710, "Galaxy Note 10" and "2018-10" may be obtained as summary texts. Also, the summary information 1 720 including the summary texts may be obtained.

According to an embodiment of the disclosure, a second conversation text 712 may be obtained based on a conversation held after the first conversation text 711 may be obtained. From the second conversation text 712 according to an embodiment of the disclosure, "Galaxy Note 8" may be obtained as a summary text. As a summary text obtained from the first conversation text 711 and having a same type as a type of "Galaxy Note 8" which is the summary text obtained from the second conversation text 712 according to an embodiment of the disclosure, "Galaxy Note 10" may be identified. According to an embodiment of the disclosure, to increase a likelihood that a summary text obtained from the current conversation is selected as summary information, a score indicating accuracy of the identified "Galaxy Note 10" may be further lowered.

According to an embodiment of the disclosure, when a score indicating an accuracy of a summary text in the summary information 1 720 or the summary information 2 730 is equal to or lower than a reference value, icons 721 and 731 indicating a summary text with a low accuracy may be displayed. The disclosure is not limited to the above example, and various types of information indicating accuracy of summary texts obtained with respect to each type may be displayed.

In addition, in the summary information 1 720 or the summary information 2 730, when there is a type in which no summary text is obtained among preset types, information indicating that no summary text is obtained may be additionally included with respect to the above type. In addition, in the summary information 1 720 or the summary information 2 730, when there are a plurality of summary texts obtained with respect to any one type, and score values of the summary texts are within a preset similarity range, information indicating that the summary texts needs modification may be further included.

Thus, a user according to an embodiment of the disclosure may check, in the summary information 1 720 or the summary information 2 730, a summary text that is low in accuracy or needs to be corrected or a type for which no summary text is obtained, and may directly correct the summary information 720 or 730, or may hold another additional conversation (e.g., asking the customer for the "product name" again) to generate again summary information including a summary text having higher accuracy.

Figure 8:
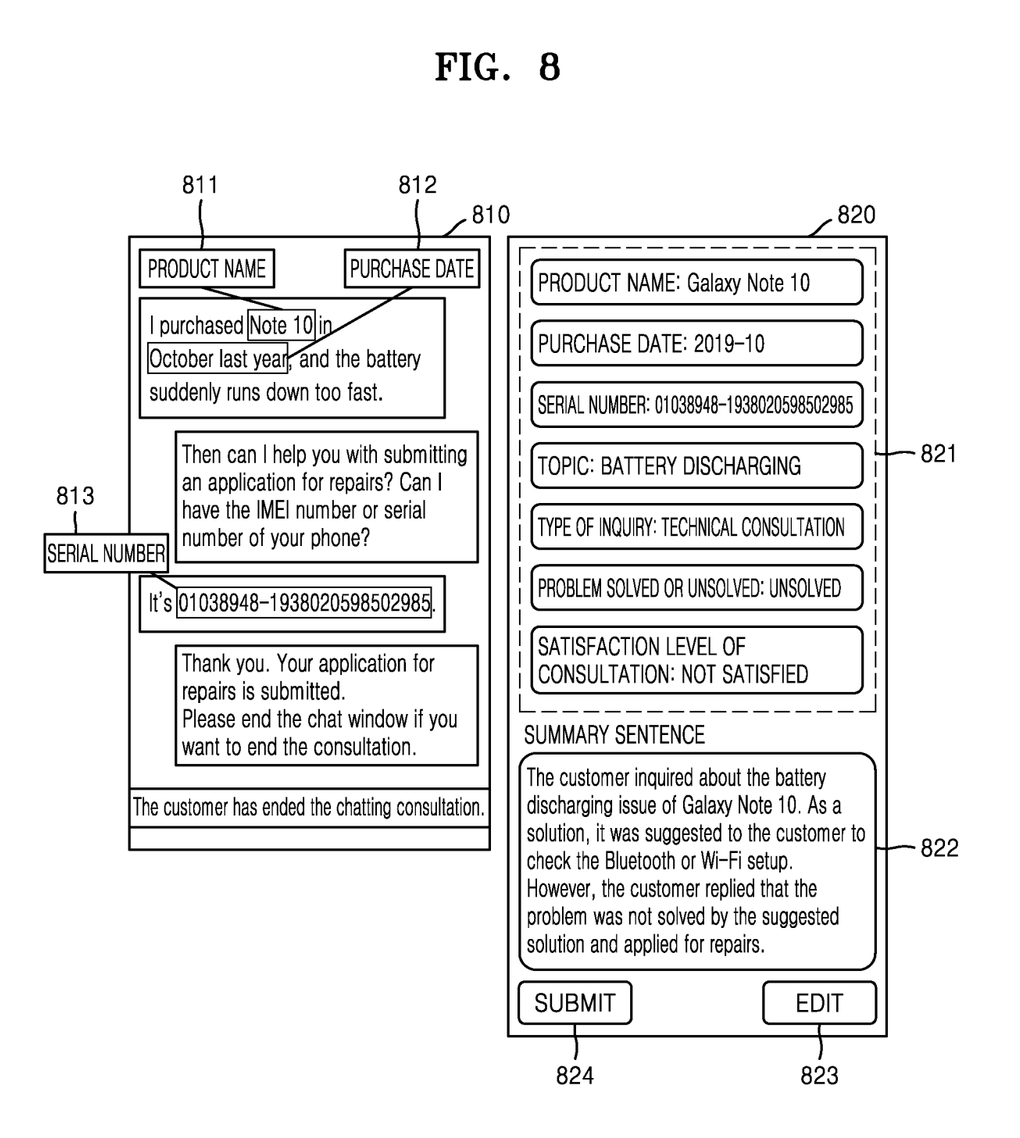
FIG. 8 is a diagram illustrating an example of providing summary information to a user, according to various embodiments.

FIG. 8 is a diagram illustrating an example of providing summary information to a user, according to various embodiments.

Referring to FIG. 8, the electronic device 1000 according to an embodiment of the disclosure may provide a conversation text 810 and summary information 820 about the conversation text 810 to a user.

According to an embodiment of the disclosure, tool tips 811, 812, and 813 may be displayed with respect to a text portion extracted as a summary text among the conversation text 810. The tool tips 811, 812, and 813 according to an embodiment of the disclosure may include information on a type corresponding to a summary text. Accordingly, the user may easily determine, based on the tool tips 811, 812, and 813, from which part of the conversation text 810 a summary text of the summary information 820 is extracted and whether the summary text is extracted as an appropriate type.

The summary information 820 according to an embodiment of the disclosure may include a summary form 821 and a summary sentence 822. In addition, the summary information 820 may further include a submit button 824 and an edit button 823. For example, when a conversation with a customer is ended, a customer service agent may check the summary information 820, and as the edit button 823 is input, the summary information 820 may be additionally modified. In addition, when there is no further correction in the summary information 820, the summary information 820 may be finally submitted to the outside as the submit button 824 is input by the customer service agent. For example, the summary information 820 may be transmitted to an external server (not shown) for storing consultation contents with various customers to be finally submitted.

According to an embodiment of the disclosure, the content of a conversation held in real time may be summarized and provided to a user.

A storage medium that can be read by a device may be provided in the form of a non-transitory storage medium. Here, a 'non-transitory storage medium' may refer to a tangible device that does not include a signal (e.g., electromagnetic wave). The term does not distinguish the case where data is semi-permanently stored in a storage medium from the case where data is temporarily stored. For example, the 'non-transitory storage medium' may include a buffer in which data is temporarily stored.

According to an embodiment of the disclosure, a method according to various embodiments disclosed in the present disclosure may be included in a computer program product and provided in that form. Computer program products can be traded between sellers and buyers as commodities. Computer program products may be distributed in the form of a device-readable storage medium (e.g., compact disc read only memory (CD-ROM)), or through an application store (e.g., Play Store™) or between two user devices (e.g., smartphones) directly or online (e.g., downloaded or uploaded). In the case of online distribution, at least some of the computer program products (e.g., downloadable apps) may be at least temporarily stored or temporarily generated in a device-readable storage medium such as a manufacturer's server, an application store's server, or a relay server's memory.

In addition, in the present disclosure, "unit" may be a hardware component such as a processor or a circuit, and/or a software component executed by a hardware component such as a processor.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims. The various example embodiments should be considered in a descriptive sense only and not for purposes of limitation. For example, each element described as a single type may be distributed, and similarly, elements described to be distributed may be combined.

What is claimed is:

1. A method, performed by an electronic device, of generating summary information of a conversation text, the method comprising:

obtaining, by the electronic device, at least one first summary text extracted from at least one conversation text of a previous conversation and a first score indicating an accuracy of the at least one first summary text, wherein the first score is obtained based on a feature of a conversation text used in extracting the at least one first summary text;

extracting, by the electronic device, at least one second summary text from a conversation text of a current conversation;

obtaining, by the electronic device, a second score indicating an accuracy of the at least one second summary text, wherein the second score is obtained based on a feature of a conversation text used in extracting the at least one second summary text;

identifying, by the electronic device, from among the at least one first summary text, a summary text having a same type as a type of the at least one second summary text;

adjusting, by the electronic device, the first score to have a value less than a current value by a specified constant value;

correcting, by the electronic device, the second score to a value in which a contextual flow is reflected, based further on at least one conversation text adjacent to the conversation text used in extracting each summary text;

selecting, by the electronic device, from among the at least one first summary text and the at least one second summary text, a summary text corresponding to each of at least one specified type based on the adjusted first score and the corrected second score of each summary text; and generating, by the electronic device, the summary information based on the selected summary text.

2. The method of claim 1, wherein the summary text is extracted from the conversation text with respect to each of at least one specified type.

3. The method of claim 1, wherein the summary information comprises at least one of a summary form including information about a summary text corresponding to each specified type or a summary sentence including at least one sentence including the summary text.

4. The method of claim 1, wherein the summary information further comprises, based on there being a type for which no summary text is obtained, from among the at least one specified type, information indicating that a summary text is not obtained with respect to the type.

5. An electronic device configured to generate summary information with respect to a conversation text, the electronic device comprising:
a memory storing at least one first summary text extracted from at least one conversation text of a previous conversation and a first score indicating an accuracy of the at least one first summary text wherein the first score is obtained based on a feature of a conversation text used in extracting the at least one first summary text;
at least one processor configured to:
extract at least one second summary text from a conversation text of a current conversation;
obtain a second score indicating an accuracy of the at least one second summary text, wherein the second score is obtained based on a feature of a conversation text used in extracting the at least one second summary text;
identify, from among the at least one first summary text, a summary text having a same type as a type of the at least one second summary text;
adjust the first score to have a value less than a current value by a specified constant value;
correct the second score to a value in which a contextual flow is reflected, based further on at least one conversation text adjacent to the conversation text used in extracting each summary text;
select, from among the at least one first summary text and the at least one second summary text, a summary text corresponding to each of at least one specified type based on the adjusted first score and the corrected second score of each summary text;
generate the summary information based on the selected summary text; and
output the summary information.

6. The electronic device of claim 5, wherein the summary text is extracted from the conversation text with respect to each of at least one specified type.

7. The electronic device of claim 5, wherein the summary information comprises at least one of a summary form including information about a summary text corresponding to each preset type or a summary sentence including at least one sentence including the summary text.

8. The electronic device of claim 5, wherein the summary information further comprises, based on there being a type for which no summary text is obtained, from among the at least one specified type, information indicating that a summary text is not obtained with respect to the type.

9. A non-transitory computer-readable recording medium having recorded thereon a program which, when executed by at least one processor of an electronic device, causes the electronic device to perform operations comprising:
obtaining at least one first summary text extracted from at least one conversation text of a previous conversation and a first score indicating an accuracy of the at least one first summary text, wherein the first score is obtained based on a feature of a conversation text used in extracting the at least one first summary text;
extracting at least one second summary text from a conversation text of a current conversation;
obtaining a second score indicating an accuracy of the at least one second summary text, wherein the second score is obtained based on a feature of a conversation text used in extracting the at least one second summary text;
identifying from among the at least one first summary text, a summary text having a same type as a type of the at least one second summary text;
adjusting the first score to have a value less than a current value by a specified constant value;
correcting the second score to a value in which a contextual flow is reflected, based further on at least one conversation text adjacent to the conversation text used in extracting each summary text;
selecting from among the at least one first summary text and the at least one second summary text, a summary text corresponding to each of at least one specified type based on the adjusted first score and the corrected second score of each summary text; and
generating summary information based on the selected summary text.

* * * * *